May 14, 1935.  R. H. REED  2,001,265
VEHICLE JACK
Filed Sept. 15, 1933
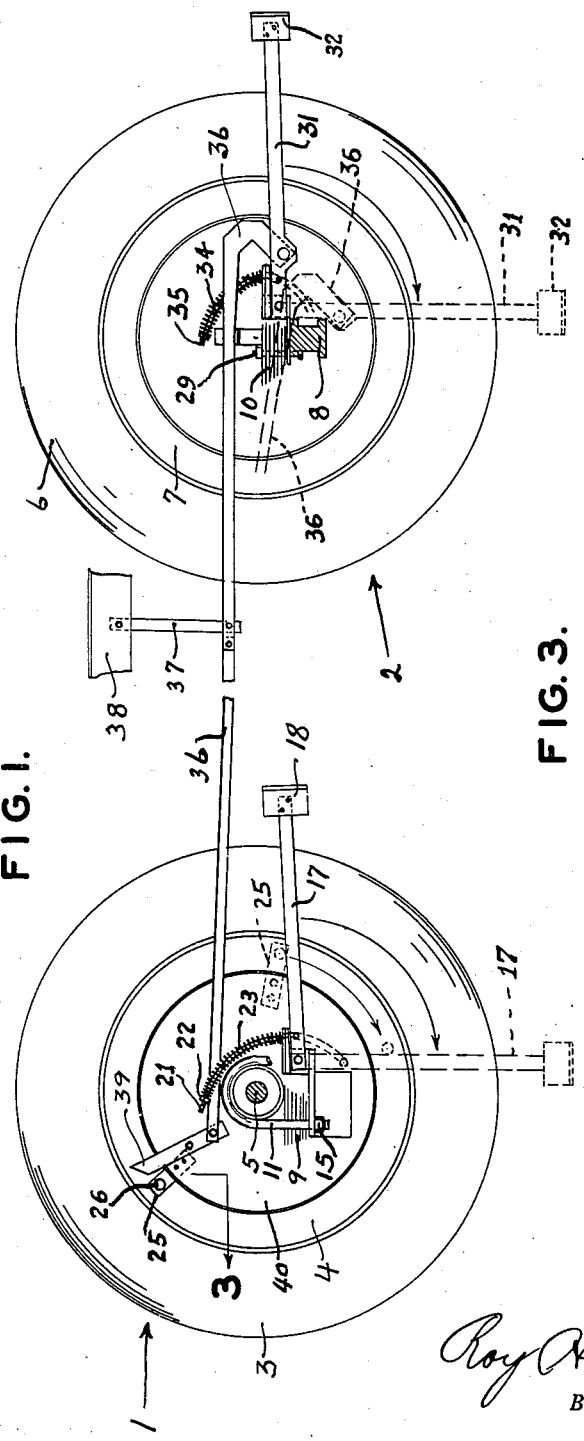
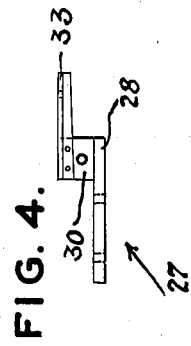
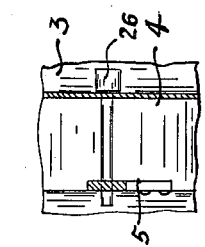
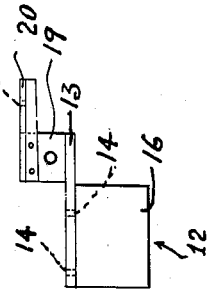
Roy H. Reed INVENTOR.
BY Loyal J. Miller
ATTORNEYS.

Patented May 14, 1935

2,001,265

UNITED STATES PATENT OFFICE 2,001,265

VEHICLE JACK

Roy H. Reed, Oklahoma City, Okla., assignor of one-half to Loyal J. Miller, Oklahoma City, Oklahoma Application September 15, 1933, Serial No. 689,575

13 Claims. (Cl. 254—86)

My invention relates to jacks, and more particularly to jacks for automotive vehicles.

The prime object of the invention is to produce a jack mounted upon the vehicle, and which may be placed in operative position for raising one or more of the vehicle wheels when one or more of the wheels are rotated.

Other objects of the invention are to provide a device of this class which is new, novel, practical and of utility; which may be driven by the usual power unit of the vehicle; which will be simple and easy to install; which will have few moving parts to become worn or to get out of order; which will be comparatively cheap to manufacture either as an accessory upon vehicles now in use, or as a factory installation upon vehicles yet to be manufactured; which will be durable; and, which will be efficient in accomplishing all of the objects for which it is intended.

At the present time much of the difficulty encountered in changing vehicle tires is occasioned by raising and lowering the injured tire. My device is designed to eliminate the labor usually attached to such an operation.

With these and other objects in view as will more fully appear, my invention consists in the construction, novel features, and combination of parts hereinafter more fully described, pointed out in the claims hereto appended, and illustrated in the accompanying one-sheet drawing, of which, Figure 1 is a fragmentary side elevation of a usual front and rear wheel of a vehicle looking from the center of the vehicle outwardly toward the left-hand side thereof;

Fig. 2 is an elevational detail of the supporting plate for attaching the device adjacent the rear wheel;

Fig. 3 is a fragmentary sectional view taken along the line 3 in Fig. 1; and,

Fig. 4 is a view similar to Fig. 2, but detailing the front supporting plate.

Like characters of reference designate like parts in all of the figures.

It is understood that various changes in the form, proportion, size, shape, weight and other details of construction within the scope of my invention, may be resorted to without departing from the spirit or broad principle of my invention and without sacrificing any of the advantages thereof; and it is also understood that the drawing is to be interpreted as being illustrative and not restrictive.

A description of one practical embodiment of the invention follows.

In Fig. 1, the reference numerals 1 and 2 indicate as a whole respectively, usual rear and front automobile wheels. The numerals 3, 4 and 5 indicate respectively the rear tire, rim, and axle or axle housing, while the reference numerals 6, 7 and 8 indicate the front tire, rim and axle. The numerals 9 and 10 indicate respectively the usual rear and front springs, and 11 indicates a usual U-bolt for holding the numerous leaves of the rear spring in engagement with the axle 5.

In installing my device upon the rear axle of the vehicle I have replaced the usual plate for engaging both ends of the U-bolt 11, with a supporting plate 12 of my own design, and which may best be seen in Fig. 2.

This plate consists substantially of a usual flat horizontal portion 13 for contacting the lower leaf of the spring 9, the portion 13 having spaced perforations 14 for receiving the ends of U-bolts 11, and a plurality of nuts, one of which is indicated by the reference numeral 15 (Fig. 1), are provided for anchoring the spring and plate in rigid connection with the axle 5. Depending from the portion 13 is a rectangular portion 16 the front edge of which acts as a stop for the downward movement of an arm or jack-leg 17 having a shoe 18 on its free end. The arm 17 is pivotally connected to an upstanding portion 19 above the flat portion 13, and the portion 19 is provided with a plane surfaced perpendicular plate 20 which acts as a means for limiting the upward movement of the arm 17.

An arcuate rod 21 having a nut 22 upon its upper end is inserted in a coil spring 23 and its lower end passes through a perforation 24 in the perpendicular plate 20 and is pivotally connected to the arm 17 therebelow. The spring 23 is of such a diameter that it cannot pass through the perforation 24, and the spring therefore acts as a retrieving spring for normally holding the arm at the upper end of its throw and against the nether surface of the perpendicular plate 20.

In Fig. 3 is detailed a means for actuating the jack-leg or arm 17 to assume the position illustrated in dotted lines in Fig. 1. The vehicle wheel which in the embodiment illustrated is of the disk type, is provided rigidly upon its inner surface with a perforated plate 25 and the disk portion of the wheel is perforated in alinement with the perforation in the plate 25 so that a pin 26 may be inserted through both perforations. The inner end of the pin projects through the plate 25 a sufficient distance to contact the arm 17 and force it downwardly into substantially a vertical position, and in so moving the arm the wheel is raised as it is rotated by power delivered by the vehicle engine. As previously stated, the forward edge of the depending portion 16 of the supporting plate 13 acts as a stop to limit the downward and rearward movement of the arm 17.

As a means for mounting the jack mechanism upon the front axle 8, the usual spring plate is replaced with a supporting plate 27 which is best illustrated in Fig. 4. This plate consists substantially of a flat horizontal portion 28 perforated to receive bolts one of which is indicated by the reference numeral 29. The bolts and plate act as a means for fastening the usual front vehicle spring to the front axle 8. The plate has an upstanding portion 30 which is centrally perforated to pivotally engage one end of an arm or jack-leg 31 having a shoe 32 rigidly connected to its free end. The upper edge of the upstanding portion 30 is provided with a perpendicular flat portion 33 which is perforated to receive a retrieving spring 34 and an arcuate rod 35 which are both similar in form and office to the members 21 and 23 hereinabove described.

As a means for actuating the front jack by the rotation of the rear wheel, a link 36 having its forward end pivotally connected to the jack-leg 31 extends through a guide 37 connected to the vehicle frame 38 rearwardly past the rear axle 5 and adjacent the wheel 1. The rear end of the link 36 is pivotally connected to one end of a lever 39 which in turn is centrally pivoted to the usual dust shield 40 of the rear brake. It will be understood of course that the shield 40 does not rotate with the wheel 1. The free end of the lever 39 extends outwardly past the rim 4 sufficiently to be engaged by the inner end of the pin 26 when the pin is inserted in the wheel as illustrated in Fig. 3. Therefore, when the wheel 1 is in a radial position to bring the plate 25 to a point anywhere below the normal position of the jack-leg 17, and below the free end of the lever 39, and the pin is then inserted, forward rotation of the wheel 1 will cause the pin to engage the lever 39 which through the action of the link 36 will cause the front jack-leg 31 to be drawn downwardly against the front axle 8. This action will of course raise the wheel 2. On the other hand, if the pin is inserted when the plate 25 is adjacent the top of the wheel and between the lever 39 and the jack-leg 17, forward rotation of the wheel will cause the pin 26 to engage and operate the rear jack-leg 17.

In the drawing and in the description hereinabove, structure has been disclosed for raising only one front and one rear wheel, it may readily be understood, however, that it is intended to provide similar structure for each side of the vehicle.

Obviously, the invention is susceptible of embodiment in forms other than that which is illustrated in the accompanying drawing and described herein, and is applicable for uses and purposes other than as detailed, and I therefore consider as my own all such modifications and adaptations and other uses of the form of the device herein described as fairly fall within the scope of my invention.

As previously stated hereinabove, only one embodiment of the invention has been illustrated and described. It is evident however, that other actuating means for the jack-legs 17 and 31 could well be provided, and that these other means would not necessarily have to be driven by the rear vehicle wheels, but could be driven from the usual vehicle drive shaft or other driven parts of the vehicle; also that the jack-legs could be pivotally mounted in such a manner, and their free ends could be so designed that when the earth was contacted by them, the momentum of the vehicle would cause it to mount one or more of the jack-legs. It is also entirely possible that the jack-legs instead of being pivotally mounted, could be mounted to reciprocate vertically, and could be powered to function by the vehicle motor. It is thought that such mechanisms would not be nearly so practical as the structure illustrated herein, however, I reserve the rights to such structures other than as illustrated as come within the scope of the appended claims.

Having thus described my invention, what is claimed and is desired to be secured by Letters Patent, is:

1. In a vehicle including a frame, an axle, and wheels carried by the axle, a lifting jack mechanism including: a leg having one end pivotally supported by said axle at one side of the axle whereby it may be swung downwardly into contact with the ground for lifting the adjacent wheel, and whereby the axle will act as a stop for retaining the leg in its lifting position, and spring means carried by the axle for retrieving and normally holding the leg clear of the ground.

2. In a vehicle including a frame, an axle, and wheels carried by the axle, a lifting jack mechanism including: a leg having one end pivotally supported by said axle at one side of the axle whereby it may be swung downwardly into contact with the ground for lifting the adjacent wheel, and whereby the axle will act as a stop for retaining the leg in its lifting position, operative connections between the leg and a driven wheel of the vehicle for propelling the leg to a lifting position, and spring means carried by the axle for retrieving and normally holding the leg clear of the ground.

3. In a vehicle including a frame, an axle, and wheels carried by the axle, a lifting jack mechanism including: a leg having one end pivotally supported in relation to said frame at one side of the axle whereby it may be swung downwardly into contact with the ground for lifting the adjacent wheel, and means for propelling the leg to a lifting position, said means including a lever pivoted intermediate its ends upon the vehicle adjacent the inner face of a driven wheel, a link pivotally connected at one end to one end of the lever and having one end connected to the leg, and a key associated with the driven wheel for engaging the free end of the lever and moving the link longitudinally when the driven wheel is rotated.

4. In a device of the class described, the combination with a vehicle including a frame, an axle, and power driven wheels carried by the axle, of a lifting jack mechanism including: a leg having one end pivotally supported by the axle adjacent a wheel whereby it may be swung downwardly into contact with the ground for lifting the wheel, and whereby the axle acts as a stop for retaining the leg in its lifting position, and a spring associated with the leg and carried by the axle for retrieving and holding the leg clear of the ground when the leg is not in its lifting position.

5. In a device of the class described, the combination with a vehicle including a frame, an axle, and power driven wheels carried by the axle, of a lifting jack mechanism including: a leg having one end pivotally supported by the axle adjacent a wheel whereby it may be swung downwardly into contact with the ground for lifting the wheel, and whereby the axle acts as a stop for retaining the leg in its lifting position, a spring associated with the leg and carried by the axle for retrieving and holding the leg clear of the ground when the leg is not in its lifting position, and an operative connection between the leg and one of the driven wheels for propelling the leg into its lifting position by rotation of the wheel.

6. Organization as described in claim 5, in which said connection includes a removable key or pin adapted to engage the wheel with the leg.

7. In a vehicle including a frame, an axle, and wheels carried by the axle, a lifting jack mechanism including: a leg having one end pivotally supported in relation to said frame at one side of the axle whereby it may be swung downwardly into contact with the ground for lifting the adjacent wheel, and means for propelling the leg to a lifting position, said means including a lever pivoted intermediate its ends upon the vehicle adjacent a driven wheel, a link pivotally connected to the lever and also connected to the leg, and a key associated with the driven wheel for engaging the lever and moving the link when the driven wheel is rotated.

8. In a vehicle including a frame, an axle, and wheels carried by the axle, a lifting jack mechanism including: a leg having one end pivotally supported in relation to said frame at one side of the axle whereby it may be swung downwardly into contact with the ground for lifting the adjacent wheel, and means for propelling the leg to a lifting position, said means including a lever pivoted intermediate its ends upon the vehicle adjacent a driven wheel, a link pivotally connected to the lever and also connected to the leg, and means associated with the driven wheel for engaging the lever and moving the link when the driven wheel is rotated.

9. In a device of the class described, the combination with a vehicle including a frame, an axle, wheels carried by the axle, and a lifting jack mechanism including a leg pivotally mounted adjacent one of the wheels and adapted to be swung from a carrying position to a position for lifting the axle, of means for returning the leg to and normally holding it in its carrying position, said means including: an arcuate rod connected at one end to the leg, a plate rigidly carried by the axle and located adjacent the rod, a coil spring surrounding the rod and bearing against the plate, and a detent upon the rod for holding the spring in place.

10. In a vehicle including a frame, a plain axle, a power driven axle, and wheels carried by the axles, a lifting jack mechanism adjacent each wheel including: a leg having one end pivotally supported by the axle and adapted to be swung downwardly into contact with the ground for lifting the adjacent wheel, spring means carried by the axle for retrieving and normally holding the leg clear of the ground, a manually operated key adapted to connect each driven wheel with the adjacent leg whereby rotation of the wheel will propel the leg to a lifting position, and operative connections between a jack-leg which is positioned adjacent an undriven wheel to a point adjacent a driven wheel whereby the same key may be caused to operate said jack-leg.

11. In a vehicle including a frame, a stationary axle, a driven axle, wheels carried by the stationary axle, and brake drums carried by the driven axle, of a lifting jack mechanism including: a leg having one end pivotally supported in relation to said frame at one side of the axle whereby it may be swung downwardly into contact with the ground for lifting the adjacent wheel, and means for propelling the leg to a lifting position, said means including a lever pivoted intermediate its ends upon the vehicle adjacent the inner face of a brake drum, a link pivotally connected at one end to one end of the lever and having one end connected to the leg, and a key associated with the brake drum for engaging the free end of the lever and moving the link longitudinally when the driven wheel is rotated.

12. In a vehicle including a frame, an axle, and wheels carried by the axle, a lifting jack mechanism including: a leg having one end pivotally supported in relation to said frame at one side of the axle whereby it may be swung downwardly into contact with the ground for lifting the adjacent wheel, and means for propelling the leg to a lifting position, said means including a lever pivoted intermediate its ends upon the vehicle adjacent a brake drum carried by a driven wheel, a link pivotally connected to the lever and also connected to the leg, and a key associated with the brake drum for engaging the lever and moving the link when the driven wheel is rotated.

13. In a lifting jack mechanism for power driven vehicles, the combination with a vehicle including axles, a power driven wheel carried by one of the axles and a brake drum carried by the wheel, of a leg having one end pivotally supported in relation to an axle whereby it may be swung downwardly into contact with the ground for lifting a wheel carried by the axle, and means for propelling the leg to a lifting position, said means including lever operated connections between the leg and the brake drum, and a key for connecting the drum and the lever.

ROY H. REED.